July 24, 1928.

W. R. ELLIS

AGITATOR

Filed May 24, 1926

Inventor,
W. R. Ellis.
By Victor J. Evans
Attorney.

Patented July 24, 1928.

1,678,425

UNITED STATES PATENT OFFICE.

WILSON R. ELLIS, OF BERKELEY, CALIFORNIA.

AGITATOR.

Application filed May 24, 1926. Serial No. 111,362.

This invention relates to agitators and has particular reference to a simply constructed household article of the character described which embodies in its mechanism an agitating element so actuated by a novel arrangement of co-operating parts as to thoroughly whip or beat mobile materials in a minimum amount of time.

Before mechanical devices were invented for whipping eggs, cream, etc., the housewife used the fork or other similar instrument in hand, and by an elliptical, lifting movement whipped her eggs or cream light and dry as desired. It is commonly known and admitted that no mechanical beater has heretofore been devised which reproduces this old time effective hand-whipping movement. The expert cook is still compelled to resort to the fork in the hand whenever her receipt calls for whites of eggs whipped dry and light.

The prime object of my present invention is to provide a mechanism reproducing the elliptical, lifting aerating action of hand-whipping.

In accomplishing this object I produce an agitator which is economical in construction, durable and highly serviceable.

Other objects and advantages will be apparent during the course of the following description.

Figure 1:
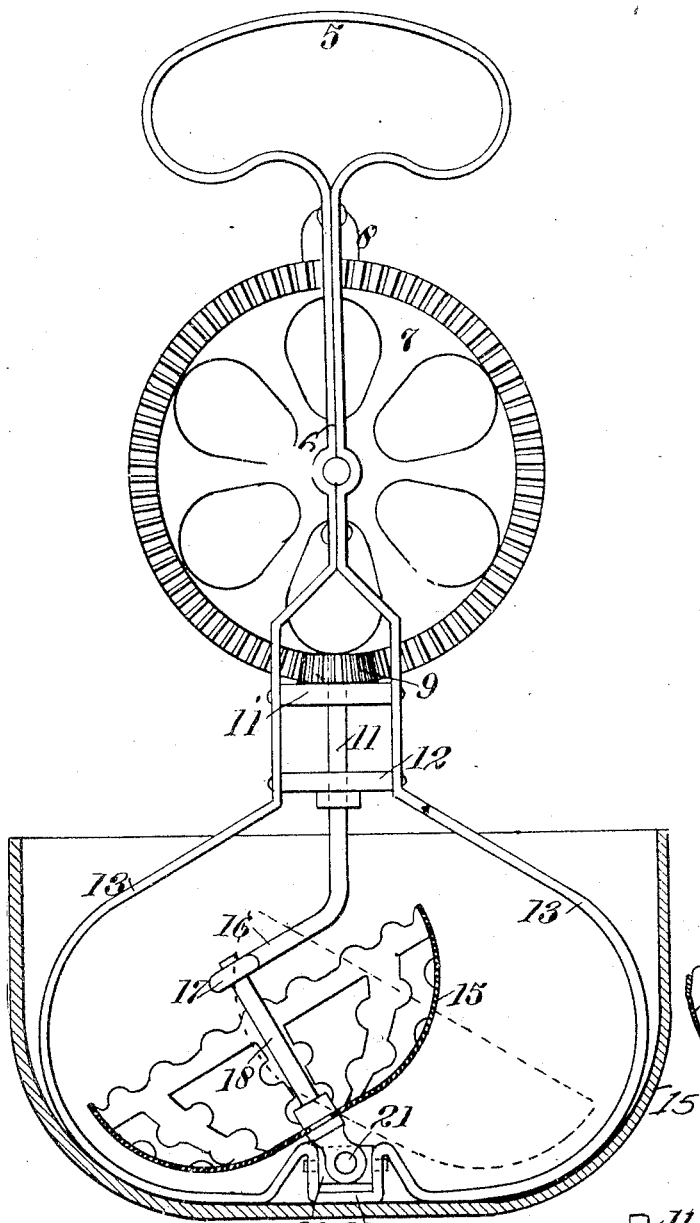
Figure 2:
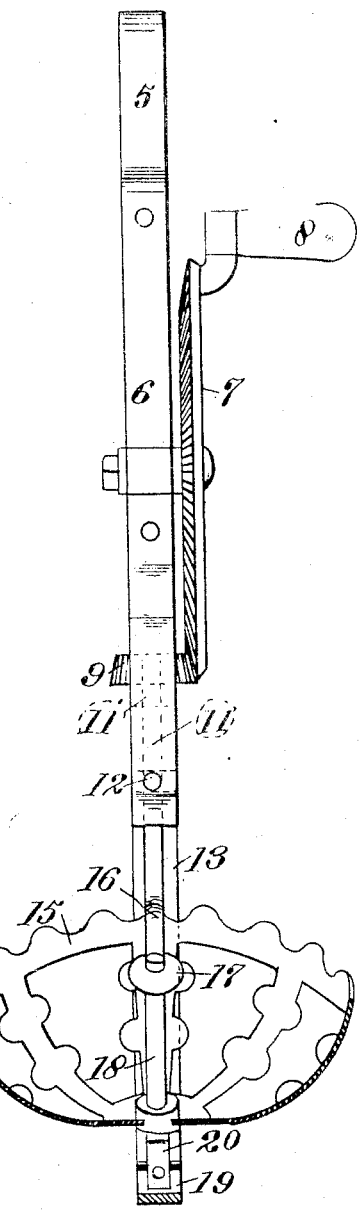
Figure 3:
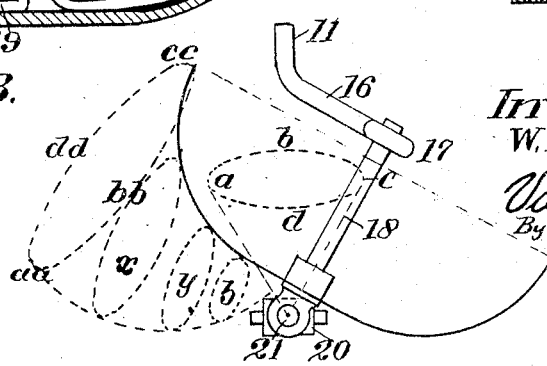

In the accompanying drawings forming a part of this specification and in which like numerals are employed to designate like parts throughout the same, Figure 1 is a rear elevation of my beater with a portion broken away in order to illustrate the mechanism thereof, Figure 2 is a view similar to Figure 1 made at right angles thereto, and Figure 3 is an enlarged detail view showing the manner of actuating the beater element and disclosing in dotted lines the elliptical lifting, whipping movement of one of the several radiating arms of the beater element.

In the accompanying drawings, wherein for the purpose of illustration is shown a preferred embodiment of my invention, the numeral 5 designates the handle having a downward extending shank 6.

Rotatably mounted upon this shank is a main gear wheel 7, having a handle 8, by which the gear may be rotated. This gear 7 is adapted to mesh with a bevel spur gear 9, which is carried and rigidly fixed upon and near the upper end of the shaft 11. The top of this shaft 11 is rotatably pivoted at the lower end of the shank 6 in the bearing 11'.

At 12 there is disclosed a second bearing for the shaft 11, supported by the frame 13. From and below this bearing 12, the frame widens and forms a loop of sufficient width to accommodate a beating element 15, as is best illustrated in Figure 1. The lower portion of this loop conforms to the shape of an ordinary bowl 15'.

The lower end of the shaft 11 is extended laterally to form an offset arm or crank 16. This offset arm has formed in its outer extremity a bearing 17 through which the upper end of a beater shaft 18 passes. Near the lower end of said shaft 18 is rigidly secured the beating or whipping element 15.

This beating or whipping element 15 is preferably formed like an inverted open umbrella with radiating arms, and apertures uniformly between said arms, of sufficient width to permit each arm to have free and effective action. These arms widen at their outer ends, and their edges may be scolloped, castleated, or serrated, as shown, to better gather and enmesh the material to be whipped.

The central bottom portion of the yoke 19 has a substantially U-shaped configuration, which forms a bearing for a rocker 20, which carries a cross pivot 21 to which is pivoted the lower extremity of the shaft 18. This arrangement provides a universal joint which permits the shaft 18 to swing freely at an angle on the pivot 21 and, at the same time, prevents any rotary movement forwardly or backwardly of said shaft 18 and the beater element 15.

A person rotating the gear 7, by the handle 8 (assuming that the entire device is in a bowl or other container within which ingredients have been placed which are to be whipped or mixed), will cause the bevel gear 9 to rotate together with the shaft 11 and the offset crank 16. This horizontal rotary movement of said offset crank 16 will cause the upper end of the shaft 18 to travel also in a horizontal circular path as shown in Figure 3.

The beating element 15 which is fixedly secured upon the shaft 18 will then swing in a rolling eccentric movement therewith as indicated in Figure 3.

Particular attention is directed to Figure 3, which shows perspectively in dotted lines the analyzed movement of one of the several radiating arms of the beater element 15. At $a$, $b$, $c$ and $d$, I indicate four equidistant points in the horizontal circle in which the crank 16 swings the upper end of the shaft 18; and at $aa$, $bb$, $cc$ and $dd$, I show the corresponding points in the lifting, elliptical movement at the outer end of one of the several radiating arms of the beater element 15. At $x$, $y$, $z$, etc., I show the corresponding movement of several inside points or fork tines on said beater arm.

It is apparent that every arm of the beater element 15, and every point on said arm is held fixedly in its movement to its own particular orbit, and that whereas the crank 16 carries the upper end of the shaft 18 in a horizontal circular plane, the planes of the circular orbits in which the various points on the beater arms travel are from the bottom upward, and from the outside toward the center. The angle at which the shaft 18 is inclined determines the degree of inclination of these beater arm orbits toward the center.

Assuming that the driving gear 7 multiplies the revolution of bevel gear 9 five times, and that there are twelve radiating arms on the beater element 15, each arm carrying the equivalent of five fork tines, it is apparent that a single revolution of the handle 8 is converted into fully 300 strokes, in the action of the beater element 15, each stroke a duplicate of the movement of the fork in the hand.

It is obvious that the construction herein described and illustrated may be modified by fixedly securing the shaft 11 and offset arm 16 to the shaft 18, thereby eliminating the universal joint. In such a case, the beater element 15 will have a bearing on shaft 18 so that the shaft 18 would be free to turn therein. As the material beaten or whipped tends to retard and even stop the rotation of the beater element 15, the universal joint may be dispensed with in this form, for it is only contributory and not vital to the operation of the agitating device.

It is further obvious that I may attach power to the shaft 11 and provide a mechanism thereby supporting the beater element 15 from above instead of by the frame, as illustrated.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. A device of the character described comprising a shank, a gear mechanism connected thereto, a frame including side arms connected to said shank and a base, a shaft rotatably mounted in said shank, a perforated cup-shaped beater element offset with relation to said shaft and rotatable therewith, and a universal joint connection between the base of the frame and said beater element whereby upon actuation of said gear mechanism a beating movement will be imparted to said beater element.

2. A device of the character described comprising a shank, a main shaft rotatably mounted therein, a frame connected to said shaft, a gear mechanism carried by said shank and said shaft for rotating the latter, a single perforated beater element supported on said shaft and positioned off-center with relation thereto, and means carried by said frame and co-operating with said beating element for imparting eccentric movement to said element upon actuation of said gear mechanism.

3. An egg beater comprising a shaft, a frame connected thereto, a gear mechanism co-operating with said shaft for rotating the same, an offset arm connected to said shaft adjacent its lower extremity, a beater shaft secured to said offset arm, a beater element carried by said arm, and a universal joint connection between said beater element and said frame whereby upon actuation of said gear mechanism an eccentric movement will be imparted to said beater element.

4. A device of the character described comprising a handle-carrying shank, a frame connected to said shank including side arms and a base, a driving gear supported by said shank, a shaft rotatably mounted within said shank, a bevel gear positioned on said shaft, and meshing with said driving gear, an offset arm connected to said shaft and rotatable therewith, a beater shaft having its upper extremity connected adjacent the end of said offset arm, a perforated cup-shaped beater element rigidly secured adjacent the lower extremity of said beater shaft, and a universal joint connection between the base of the frame and the bottom of said beater element whereby upon actuation of said gear mechanism a rocking movement will be imparted to said beater element.

In testimony whereof I affix my signature.

WILSON R. ELLIS.